Sept. 26, 1950        J. F. WALSH        2,523,484
PIPE SUPPORT
Filed June 25, 1947
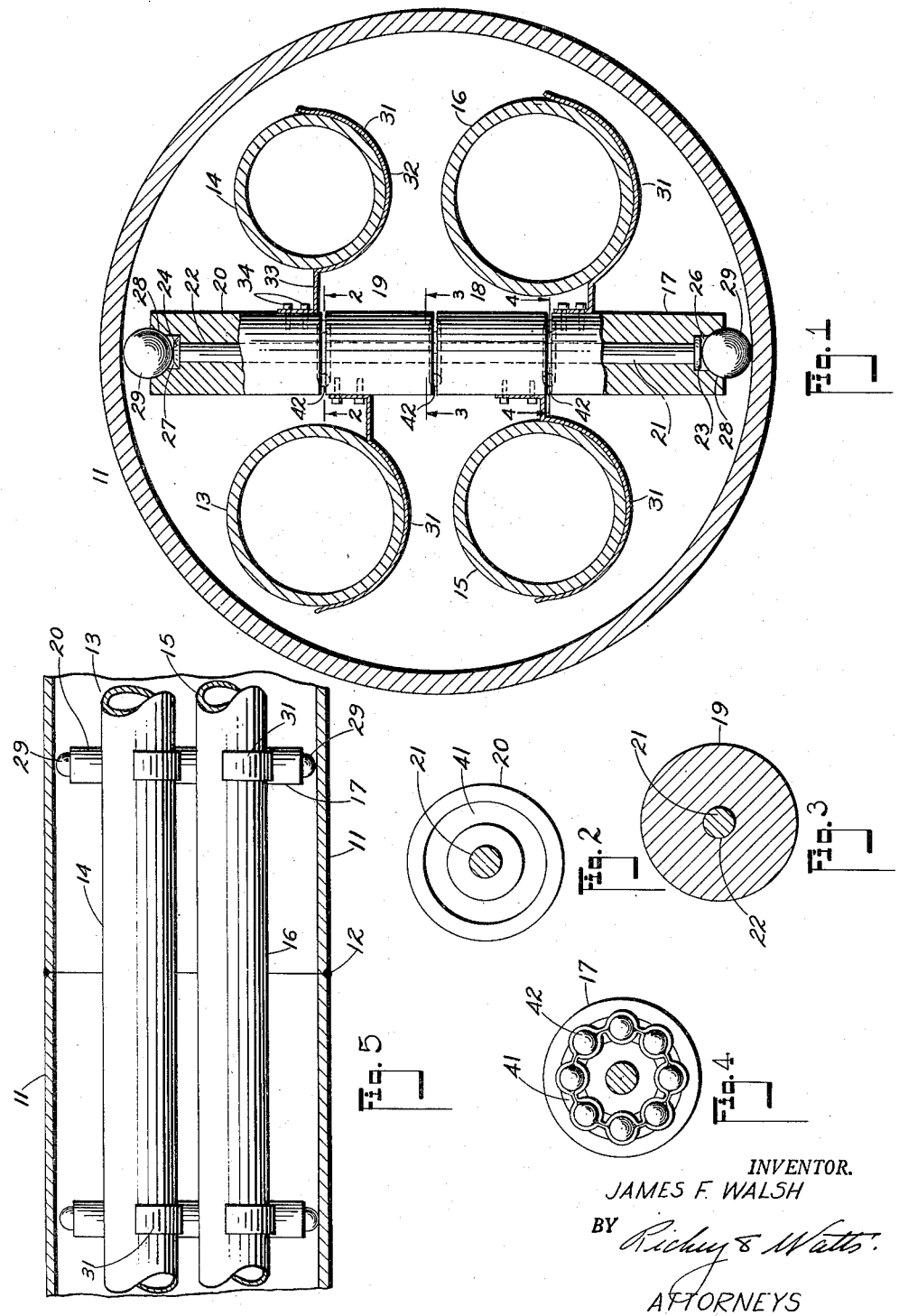
INVENTOR.
JAMES F. WALSH
BY
*Richey & Watts*
ATTORNEYS Patented Sept. 26, 1950

2,523,484

UNITED STATES PATENT OFFICE 2,523,484

PIPE SUPPORT

James F. Walsh, East Cleveland, Ohio

Application June 25, 1947, Serial No. 756,900

3 Claims. (Cl. 248—49)

This invention relates to the art of installing multiple runs of pipe in large conduits and is particularly directed to improvements in the supporting structure for the pipes.

In laying conduits between buildings such, for example, as the pipe lines between a boiler house and buildings serviced therefrom, it is desirable and of economic interest to install a number of pipes such as steam flow and return lines, hot water supply lines and the like through a large outer casing which protects the pipes and the lagging or insulation with which they may be covered. Such installations present serious constructional difficulties, as it is not practicable to make the outer casing large enough to permit the entry of a workman in the conduit. One solution is to join the lengths of pipe concurrent the assembly of the sections of the casing. This method is not particularly satisfactory, especially when the casing is installed by tunneling rather than by trenching.

Another problem encountered in multi-pipe installations is that of expansion and contraction of long runs of pipe consequent changes in temperature of the fluid within the lines, and thermal changes effected by the weather. Such variations in expansion and contraction necessitate the support of the pipes in a manner which will accommodate relative movement between the individual pipes in the assembly, and/or each pipe and the casing.

This invention resides principally in an improved pipe support which provides for individual expansion and contraction of the pipes, and which is adapted for translation through the casing so that the pipe sections may be assembled at one end of the completed run of casing and fed into the casing, the support protecting the pipes and their external insulation, if any, from abrasion against the casing.

The principal objects of the invention are:

To provide a support for a plurality of pipes which will accommodate joint or relative movement of the pipes;

To provide a pipe support which is adapted for translation with the pipes through a casing; and To provide a pipe supporting structure which will facilitate a more efficacious and satisfactory method of installation of pipes within a casing than has been possible with pipe carriers heretofore in use.

Other objects and advantages of the invention more or less ancillary in nature will be apparent to those skilled in the art from the description herein of the preferred embodiment of the invention.

Referring to the drawings:

Fig. 1 is a transverse section of a pipe installation according to the invention;

Figs. 2, 3 and 4 are partial horizontal sections taken on the planes indicated in Fig. 1; and Fig. 5 is a longitudinal section of the installation of Fig. 1.

A typical installation according to the invention comprises an outer conduit or casing 11 preferably of steel and formed in sections welded together as indicated at 12. Individual pipes 13, 14, 15, and 16, which may be of any number, as required in the particular installation, are supported free and clear of each other and the casing by the pipe support of the invention. In its preferred form the pipe support is formed of a number of sections or units 17, 18, 19, and 20, corresponding in number to the number of pipes, assembled to form a column. The units 17 to 20 are maintained in an assembled relation by a rod 21 passing through a central bore 22 in the units with heads 23 and 24 within counterbores 26 and 27 in the lower end of the unit 17 and the upper end of the top unit 20. One of these heads may be formed on the rod before the units are assembled thereon, and the other head is formed after assembly by peening to prevent separation of the units 17 to 20. The intermediate units 18 and 19 are of identical construction, except that they may differ in length, and the upper and lower units 20 and 17 are likewise identical, except that they are in inverted relation to each other.

The outer extremities of the units 17 and 20 are machined to provide spherical sockets 28 for bearing balls 29 which serve to facilitate lineal translation of the support through the casing, transaxial rotation thereof, and pivotal movement of the units 17 to 20 within the casing. Pipe hangers 31 are secured to the contiguous column units 17 to 20, each hanger comprising an arcuate section 32 formed to underlie and support the pipe, and further formed with an offset bracket 33 secured to the column unit by machine screws 34. The dimensions of the hanger are determined by the diameters of the pipes and relation thereof in the installation. The radius of the arcuate portion 32 of the hanger is slightly larger than the external radius of the pipe, and the free end thereof is bowed slightly outward in order to minimize the frictional resistance between the pipe and cradle. The column sections and hangers may rotate individually about the medial axis of the rod 21 in accordance with the expansion and contraction of the pipes. To facilitate this rotation, anti-friction bearings are mounted between sections, as shown most clearly in Figs. 2 and 4. Circular channels 41 are formed in the opposed ends of the intermediate column units 17 and 20, such channels serving as races for thrust ball bearing units 42.

As an alternative, any suitable friction-reducing bearing may be employed between the units of the pipe support, such as, for example, oil-impregnated washers of bearing metal.

As will be apparent, in the assembly of the support the individual units are assembled in end to end relation with the ball bearings in place. The rod 21 is passed through the central bore and peened over, thus holding the units together; the bore of course must be formed with sufficient clearance to permit free rotation of each element of the assembly. This result may be obtained by separating two of the units slightly by temporary shims or the like when the end of the rod is riveted or peened over.

The pipes 13 to 16 may be insulated in any desired manner and the insulation may be cut away at the points of contact to permit the pipe to rest directly against the hangers 31, or, if desired, the hangers may be formed to accommodate the contour of the lagging.

The overall length of the pipe support with the balls 29 in place should be slightly less than the internal diameter of the casing to provide a small clearance, say one-sixteenth of an inch, so that the assembly will override minor irregularities in the casing.

In the assembly of the complete system, the casing 11 is installed in any suitable manner, sufficient working space being provided at one end of the excavation for the casing to permit the sections of pipe to be united in accordance with the accepted practice. As the sections are coupled, the pipes are laid on the hangers 31 and the support, while held in a vertical position, is placed in the opening of the casing. The pipes and supporting assembly are then fed into the casing concurrently, the balls 29, particularly the lower one, reducing the friction during such operation. The entire pipe assembly, with the support, is then moved forward, as additional sections are added, until the leading ends of the pipes reach the far end of the casing. The supports then remain in place, maintaining the pipes in properly aligned relation. Expansion and contraction of the pipes is accommodated by rotation of the column sections 17 to 20 about the medial rod 21, by rotational movement of the column within the casing, and by rotational movement of the sections.

The construction described herein is obviously suited to installation of electrical cables or conduits and other structures analogous in form to pipes in a common conduit with pipes, or separately. The term "conduit" in the claims is intended to define any such structure.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. In combination, an elongated cylindrical casing, a plurality of conduits disposed longitudinally thereof, and support means for the conduits comprising a plurality of upright spaced columnar members, each columnar member comprising a shaft, a plurality of sleeves freely rotatable on the shaft, conduit hangers fixed to certain of the sleeves, and anti-friction bearing means on each end sleeve of each columnar member for movably engaging the casing.

2. In combination, an elongated cylindrical casing, a plurality of conduits disposed longitudinally thereof, and support means for the conduits comprising a plurality of upright spaced columnar members, each columnar member comprising a plurality of aligned units, means for mounting said units for free independent relative rotation about the axes of the columnar member, conduit hangers fixed to certain of said units, and anti-friction bearing means on each end of each columnar member for movably engaging the casing.

3. For use in combination with an elongated cylindrical casing, means for supporting a plurality of conduits in said casing, comprising a plurality of upright spaced columnar members, each columnar member comprising a shaft, a plurality of sleeves freely rotatable on the shaft, conduit hangers fixed to certain of the sleeves, and anti-friction bearing means on each end sleeve of each columnar member for movably engaging the casing.

JAMES F. WALSH.

REFERENCES CITED

The following references are of record in the file of this patent:

UNITED STATES PATENTS

| Number | Name | Date |
| --- | --- | --- |
| 921,832 | Hersey | May 18, 1909 |
| 1,122,130 | Lamson | Dec. 22, 1914 |
| 1,220,343 | Kimball | Mar. 27, 1917 |
| 1,529,613 | Burke | Mar. 10, 1925 |
| 2,330,197 | Allen et al. | Sept. 28, 1943 |
| 2,407,217 | Banneyer | Sept. 10, 1946 |

FOREIGN PATENTS

| Number | Country | Date |
| --- | --- | --- |
| 197,201 | Great Britain | May 10, 1923 |
| 275,028 | Great Britain | Aug. 4, 1927 |
| 51,246 | Denmark | Feb. 10, 1936 |